United States Patent
Kurozaki et al.

(10) Patent No.: US 11,695,296 B2
(45) Date of Patent: Jul. 4, 2023

(54) UNINTERRUPTIBLE POWER SUPPLY

(71) Applicant: FUJI ELECTRIC CO., LTD., Kawasaki (JP)

(72) Inventors: Tomo Kurozaki, Kobe (JP); Seiitsu Kin, Hachioji (JP)

(73) Assignee: FUJI ELECTRIC CO., LTD., Kawasaki (JP)

(*) Notice: Subject to any disclaimer, the term of this patent is extended or adjusted under 35 U.S.C. 154(b) by 107 days.

(21) Appl. No.: 16/927,207

(22) Filed: Jul. 13, 2020

(65) Prior Publication Data

US 2021/0021152 A1    Jan. 21, 2021

(30) Foreign Application Priority Data

Jul. 17, 2019 (JP) .............................. JP2019-131684

(51) Int. Cl.
*H02J 9/06* (2006.01)

(52) U.S. Cl.
CPC .................................. *H02J 9/068* (2020.01)

(58) Field of Classification Search
CPC ...................................................... H02J 9/068
See application file for complete search history.

(56) References Cited

U.S. PATENT DOCUMENTS

| 2010/0302744 | A1* | 12/2010 | Englert | ............... | H05K 7/1497 |
| | | | | | 361/730 |
| 2018/0131166 | A1* | 5/2018 | Emert | ....................... | H02J 3/00 |
| 2019/0190312 | A1 | 6/2019 | Kin et al. | | |

FOREIGN PATENT DOCUMENTS

| JP | 2011-072068 A | 4/2011 |
| JP | 2018-026969 A | 2/2018 |

* cited by examiner

*Primary Examiner* — Daniel Cavallari
(74) *Attorney, Agent, or Firm* — Manabu Kanesaka

(57) ABSTRACT

An uninterruptible power supply includes a plurality of uninterruptible power supply modules each including a power converter, an input/output module that outputs power converted by the power converter to an outside of the uninterruptible power supply, and a disconnection module including a housing that houses disconnection switches that electrically disconnect each of the plurality of uninterruptible power supply modules individually.

10 Claims, 9 Drawing Sheets

UNINTERRUPTIBLE POWER SUPPLY

CROSS-REFERENCE TO RELATED APPLICATION

The present application claims priority of Japanese Patent Application No. 2019-131684 filed Jul. 17, 2019, the disclosure of which is hereby incorporated by reference.

BACKGROUND OF THE INVENTION

Field of the Invention

The present invention relates to an uninterruptible power supply, and more particularly, it relates to an uninterruptible power supply including a plurality of uninterruptible power supply modules.

Description of the Background Art

An uninterruptible power supply including a plurality of uninterruptible power supply modules is known in general, as disclosed in Japanese Patent Laid-Open No. 2011-072068, for example.

Japanese Patent Laid-Open No. 2011-072068 discloses an uninterruptible power supply including a common AC input power supply and a plurality of uninterruptible power supply modules each including a power converter. Each of the plurality of uninterruptible power supply modules includes a switch that electrically disconnects the common AC input power supply from the power converter inside each of the uninterruptible power supply modules. The uninterruptible power supply modules of the uninterruptible power supply disclosed in Japanese Patent Laid-Open No. 2011-072068 are configured such that the common AC input power supply can be electrically disconnected, for each uninterruptible power supply module, from the power converter inside each of the uninterruptible power supply modules by the switch provided for each uninterruptible power supply module.

In the uninterruptible power supply disclosed in Japanese Patent Laid-Open No. 2011-072068, the uninterruptible power supply modules are configured such that the common AC input power supply can be electrically disconnected, for each uninterruptible power supply module, from the power converter inside each of the uninterruptible power supply modules by the switch provided for each uninterruptible power supply module. However, the switch is provided inside each uninterruptible power supply module, and thus even when the power converter inside the uninterruptible power supply module to be maintained is electrically disconnected from the AC input power supply by the switch when maintenance is performed on the uninterruptible power supply module, a voltage cannot be completely removed from the inside of the uninterruptible power supply module to be maintained, and power is continuously supplied from the common AC input power supply side to the switch itself. Therefore, when the switch provided inside each uninterruptible power supply module is maintained and replaced, it is necessary to stop power supply from the common AC input power supply and stop power supply from all of the uninterruptible power supply modules in order to completely remove a voltage from the inside of the uninterruptible power supply module to be maintained. Consequently, when one of the plurality of uninterruptible power supply modules is maintained, the switch provided inside the uninterruptible power supply module cannot be maintained or replaced unless power supply from the uninterruptible power supply modules is completely stopped, and power cannot be supplied from uninterruptible power supply modules on which maintenance is not performed during maintenance and replacement of the switch.

SUMMARY OF THE INVENTION

The present invention has been proposed in order to solve the aforementioned problem, and an object of the present invention is to provide an uninterruptible power supply in which all components of an uninterruptible power supply module to be maintained can be maintained and replaced while power is supplied from uninterruptible power supply modules on which maintenance is not performed when maintenance is performed on the uninterruptible power supply module.

In order to attain the aforementioned object, an uninterruptible power supply according to an aspect of the present invention includes a plurality of uninterruptible power supply modules each including a power converter that converts power received from an AC power supply outside the uninterruptible power supply, an input/output module that inputs the power received from the AC power supply outside the uninterruptible power supply to the power converter and outputs the power converted by the power converter to an outside of the uninterruptible power supply, and a disconnection module including a housing that houses disconnection switches that electrically disconnect each of the plurality of uninterruptible power supply modules individually.

As described above, the uninterruptible power supply according to this aspect includes the disconnection module including the housing that houses the disconnection switches that perform a disconnection operation to electrically disconnect each of the plurality of uninterruptible power supply modules individually. Accordingly, the entirety of the uninterruptible power supply modules can be electrically disconnected for each uninterruptible power supply module by the disconnection switches housed in the housing of the disconnection module, and thus all components of the uninterruptible power supply module to be maintained can be maintained and replaced without stopping power supply from the AC power supply and completely stopping power supply from the uninterruptible power supply modules on which maintenance is not performed. Consequently, it is possible to provide the uninterruptible power supply in which all components of the uninterruptible power supply module to be maintained can be maintained and replaced while power is supplied from the uninterruptible power supply modules on which maintenance is not performed when maintenance is performed on the uninterruptible power supply module.

In the aforementioned uninterruptible power supply according to this aspect, the plurality of uninterruptible power supply modules, the input/output module, and the disconnection module are preferably integral with each other.

In the aforementioned uninterruptible power supply according to this aspect, the disconnection switches preferably include a plurality of disconnection switches that performs a disconnection operation individually on each of the plurality of uninterruptible power supply modules, the plurality of disconnection switches being housed in the housing of the disconnection module so as to correspond to the plurality of uninterruptible power supply modules, respectively. Accordingly, the plurality of disconnection switches is provided for each of the uninterruptible power supply modules, and thus the disconnection operation for each of the plurality of uninterruptible power supply modules can be reliably performed.

In the aforementioned uninterruptible power supply according to this aspect, the plurality of disconnection switches housed in the housing of the disconnection module preferably includes an AC input disconnection switch provided between the AC power supply outside the uninterruptible power supply and each of the plurality of uninterruptible power supply modules, an AC output disconnection switch provided on an AC output side of each of the plurality of uninterruptible power supply modules, and a DC input disconnection switch provided on a DC input side of each of the plurality of uninterruptible power supply modules. Accordingly, on the AC input side, the AC output side, and the DC input side, the disconnection switches (the AC input disconnection switch, the AC output disconnection switch, and the DC input disconnection switch) are provided, respectively, and thus the disconnection operation can be performed on each of the AC input side, the AC output side, and the DC input side.

In the aforementioned uninterruptible power supply according to this aspect, the plurality of uninterruptible power supply modules is preferably arranged adjacent to each other, an uninterruptible power supply module arranged closest to the disconnection module among the plurality of uninterruptible power supply modules preferably includes a connection wiring that electrically connects its own power converter to a corresponding one of the plurality of disconnection switches, and a relay wiring that electrically connects a remaining one of the plurality of uninterruptible power supply modules to a remaining one of the plurality of disconnection switches, and the relay wiring is preferably provided corresponding to each of the plurality of uninterruptible power supply modules to be relayed in the uninterruptible power supply module arranged closest to the disconnecting module. Accordingly, the relay wiring that electrically connects the remaining one of the plurality of uninterruptible power supply modules to the remaining one of the plurality of disconnection switches is provided in the uninterruptible power supply module arranged closest to the disconnecting module such that the remaining one of the plurality of uninterruptible power supply modules can electrically connect to the disconnection module simply by electrically connecting to the relay wiring of the uninterruptible power supply module arranged closest to the disconnecting module. Consequently, as compared with a case in which the uninterruptible power supply module arranged closest to the disconnecting module does not include the relay wiring, the remaining one of the plurality of uninterruptible power supply modules can easily electrically connect to the disconnection module.

In the aforementioned uninterruptible power supply according to this aspect, the plurality of uninterruptible power supply modules preferably includes a first uninterruptible power supply module, a second uninterruptible power supply module, and a third uninterruptible power supply module arranged in this order from a side of the input/output module, and the relay wiring preferably includes a first relay wiring provided in the first uninterruptible power supply module, the first relay wiring connecting the second uninterruptible power supply module to a corresponding one of the plurality of disconnection switches, and a second relay wiring provided in the first uninterruptible power supply module and the second uninterruptible power supply module, the second relay wiring connecting the third uninterruptible power supply module to a corresponding one of the plurality of disconnection switches. Accordingly, the first uninterruptible power supply module includes the first relay wiring such that the second uninterruptible power supply module can electrically connect to the disconnection module simply by electrically connecting to the first relay wiring of the first uninterruptible power supply module. Furthermore, the first uninterruptible power supply module and the second uninterruptible power supply module include the second relay wiring such that the third uninterruptible power supply module can electrically connect to the disconnection module simply by electrically connecting to the second relay wiring of the second uninterruptible power supply module. Consequently, as compared with a case in which the first uninterruptible power supply module does not include the first relay wiring, and the first uninterruptible power supply module and the second uninterruptible power supply module do not include the second relay wiring, the second uninterruptible power supply module and the third uninterruptible power supply module can easily electrically connect to the disconnection module.

In the aforementioned uninterruptible power supply according to this aspect, the relay wiring preferably further includes a third relay wiring provided in the first uninterruptible power supply module, the second uninterruptible power supply module, and the third uninterruptible power supply module, the third relay wiring connecting another uninterruptible power supply module to a corresponding one of the plurality of disconnection switches when the another uninterruptible power supply module is arranged on a side of the third uninterruptible power supply module opposite to a side on which the second uninterruptible power supply module is arranged. Accordingly, when the uninterruptible power supply module is newly arranged on the side of the third uninterruptible power supply module opposite to the side on which the second uninterruptible power supply module, the uninterruptible power supply module newly arranged can electrically connect to the disconnection module by connecting to the third relay wiring provided in advance. Thus, when the uninterruptible power supply module is newly arranged, the uninterruptible power supply module can be easily added as compared with a case in which a wiring that electrically connects the newly arranged uninterruptible power supply module to the disconnection module is newly provided.

In the aforementioned uninterruptible power supply according to this aspect, each of the connection wiring and the relay wiring preferably includes at least one laminated bus bar in which a plurality of plate-shaped conductors and insulators that cover the plurality of plate-shaped conductors are stacked, the first relay wiring preferably includes at least two laminated bus bars connected to each other, the second relay wiring preferably includes at least three laminated bus bars connected to each other, and the connection wiring, the first relay wiring, and the second relay wiring preferably overlap each other in a plan view. Accordingly, the connection wiring, the first relay wiring, and the second relay wiring can overlap each other in a state insulated from each other, and thus even when an arrangement space is small, the connection wiring, the first relay wiring, and the second relay wiring can be easily arranged. Furthermore, the first relay wiring and the second relay wiring include a plurality of laminated bus bars connected to each other, and thus the first relay wiring and the second relay wiring can be detached and attached at a laminated bus bar connection point. Thus, as compared with a case in which the first relay wiring and the second relay wiring include one laminated bus bar, the number of detachable and attachable locations can be increased. Consequently, when the uninterruptible power supply modules are detached or added, the first relay wiring and the second relay wiring can be easily detached and attached.

In the aforementioned uninterruptible power supply according to this aspect, the disconnection module preferably includes a plurality of disconnection modules including a first disconnection module and a second disconnection module, the first disconnection module is preferably connected to some of the plurality of uninterruptible power supply modules, and the second disconnection module is preferably connected to remaining ones of the plurality of the uninterruptible power supply modules. Accordingly, the uninterruptible power supply modules are connected to the first disconnection module or the second disconnection module, and thus even when a failure occurs in one of the disconnection modules, and power cannot be supplied using the uninterruptible power supply modules connected to the disconnection module in which a failure occurs, power can be supplied using the uninterruptible power supply modules connected to the other of the disconnection modules.

In the aforementioned uninterruptible power supply according to this aspect, the disconnection module preferably has a width smaller than a width of each of the plurality of uninterruptible power supply modules. Accordingly, the width per disconnection module is smaller than the width per uninterruptible power supply module, and thus even when the disconnection modules are provided, an increase in the width of the entire uninterruptible power supply can be significantly reduced or prevented as compared with a case in which the width per disconnection module is larger than or equal to the width per uninterruptible power supply module.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention is hereinafter described with reference to the drawings.

(Overall Configuration of Uninterruptible Power Supply)

The circuit configuration and an arrangement of modules of an uninterruptible power supply 100 according to the present embodiment are now described with reference to FIGS. 1 to 3.

Figure 1:
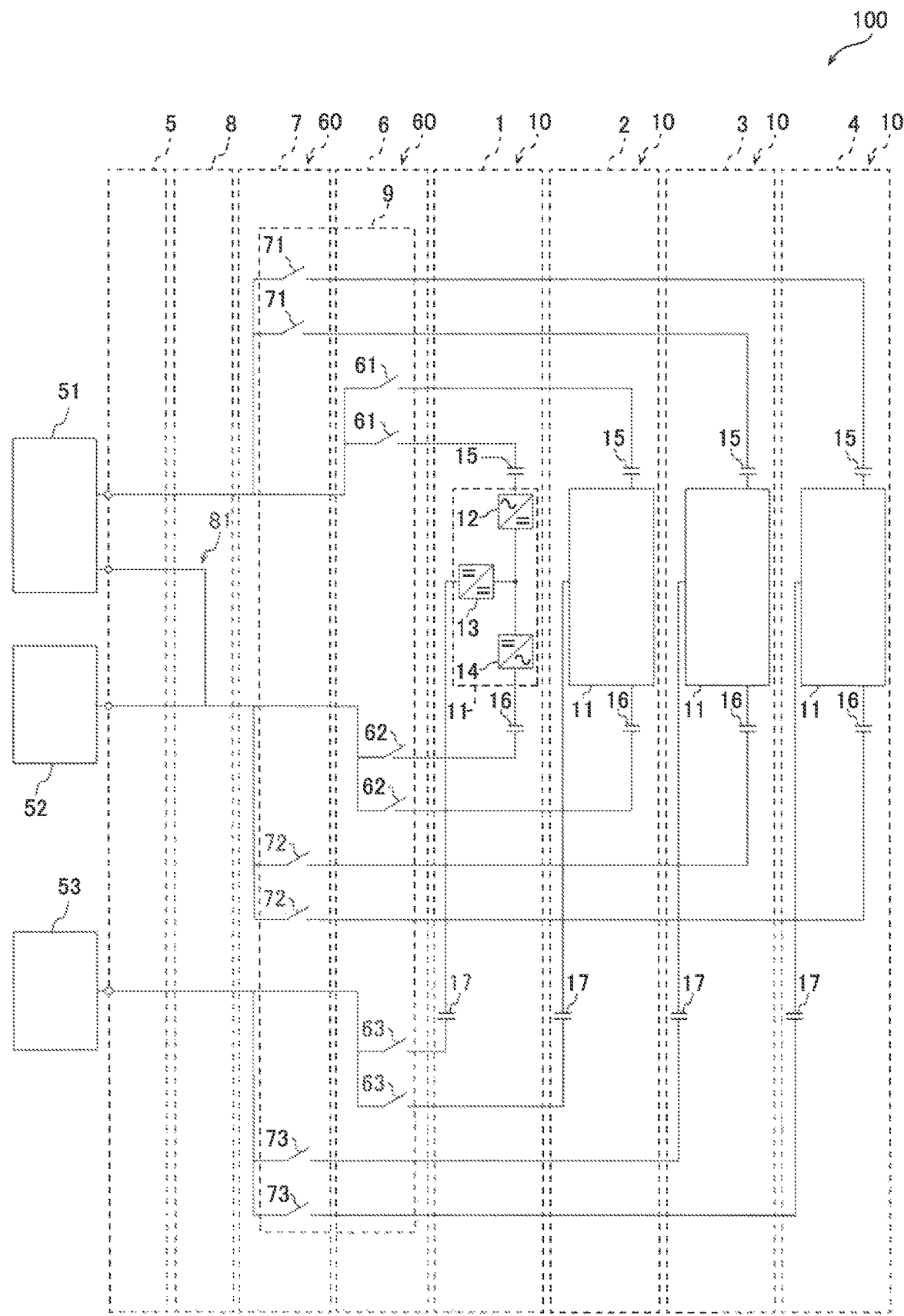
FIG. 1 is a circuit diagram of an uninterruptible power supply according to an embodiment of the present invention.

As shown in FIG. 1, the uninterruptible power supply 100 includes a plurality of uninterruptible power supply modules 10 (a first uninterruptible power supply module 1, a second uninterruptible power supply module 2, a third uninterruptible power supply module 3, and a fourth uninterruptible power supply module 4), an input/output module 5 (I/O module), and disconnection modules 60 (a first disconnection module 6 and a second disconnection module 7). Furthermore, the uninterruptible power supply 100 includes a control module 8. The uninterruptible power supply 100 is configured to receive three-phase (U-phase, V-phase, and W-phase) AC power and output the three-phase AC power. The uninterruptible power supply 100 is also configured to receive two-phase (P-phase and N-phase) DC power.

The plurality of uninterruptible power supply modules 10 includes the first uninterruptible power supply module 1, the second uninterruptible power supply module 2, and the third uninterruptible power supply module 3, which are arranged in this order from the input/output module 5 side. Specifically, in the uninterruptible power supply 100 according to the present embodiment, the control module 8, the second disconnection module 7, the first disconnection module 6, the first uninterruptible power supply module 1, the second uninterruptible power supply module 2, the third uninterruptible power supply module 3, and the fourth uninterruptible power supply module 4 are arranged in this order (see FIG. 2) from the input/output module 5 side.

The plurality of uninterruptible power supply modules 10 (the first uninterruptible power supply module 1, the second uninterruptible power supply module 2, the third uninterruptible power supply module 3, and the fourth uninterruptible power supply module 4) is arranged adjacent to each other. The plurality of uninterruptible power supply modules 10 is electrically arranged in parallel to each other. Each of the plurality of uninterruptible power supply modules 10 includes a power converter 11 (see FIG. 1) that converts power received from an AC power supply 51 outside the uninterruptible power supply 100. The power converter 11 includes a rectifier circuit 12, a chopper circuit 13, and an inverter circuit 14. In addition, the power converter 11 includes an element made of silicon carbide (SiC). Thus, the power converter 11 reduces a power loss and the amount of heat generated due to the power loss as compared with a case in which the power converter 11 includes an element made of silicon. Furthermore, the power converter 11 is electrically connected to a disconnection switch 9 provided in the disconnection module 60 (the first disconnection module 6 or the second disconnection module 7) via any of connection wiring 91, connection wiring 92, connection wiring 93, relay wiring 21, relay wiring 22, relay wiring 23, relay wiring 31, relay wiring 32, relay wiring 33, relay wiring 41, relay wiring 42, and relay wiring 43, which include laminated bus bars, as described below.

The rectifier circuit 12 has a function of converting AC power input to the power converter 11 into DC power. The chopper circuit 13 is configured as a three-level chopper circuit, for example. The chopper circuit 13 has a function of transforming a voltage input from a battery 53 and outputting the voltage. DC power input from the battery 53 is input to the chopper circuit 13 via a conductor, a capacitor, and a DC reactor, which are not shown. The inverter circuit 14 has a function of converting DC power input from the rectifier circuit 12 and the chopper circuit 13 into AC power.

Each of the uninterruptible power supply modules 10 also includes AC input-side switches 15. AC power is input from the AC power supply 51 to the AC input-side switches 15. An AC input-side switch 15 is provided for each phase (U-phase, V-phase, and W-phase). In FIGS. 1 and 3, each AC input-side switch 15 is shown collectively for three phases (U-phase, V-phase, and W-phase) for simplification.

Each of the uninterruptible power supply modules 10 also includes AC output-side switches 16. The AC output-side switches 16 are configured to output the AC power from the power converter 11. An AC output-side switch 16 is provided for each phase (U-phase, V-phase, and W-phase). In FIGS. 1 and 3, each AC output-side switch 16 is shown collectively for three phases (U-phase, V-phase, and W-phase) for simplification.

Each of the uninterruptible power supply modules 10 also includes DC input-side switches 17. DC power is input from the battery 53 to the DC input-side switches 17. A DC input-side switch 17 is provided for each phase (P-phase and N-phase). In FIGS. 1 and 3, each DC input-side switch 17 is shown collectively for two phases (P-phase and N-phase) for simplification.

Each of the plurality of uninterruptible power supply modules 10 (the first uninterruptible power supply module 1, the second uninterruptible power supply module 2, the third uninterruptible power supply module 3, and the fourth uninterruptible power supply module 4) includes the power converter 11, the AC input-side switches 15, the AC output-side switches 16, and the DC input-side switches 17.

The input/output module 5 is configured to input power received from the AC power supply 51 outside the uninterruptible power supply 100 to the power converter 11, and to output the power converted by the power converter 11 to the outside.

The control module 8 controls the plurality of uninterruptible power supply modules 10 (the first uninterruptible power supply module 1, the second uninterruptible power supply module 2, the third uninterruptible power supply module 3, and the fourth uninterruptible power supply module 4). The control module 8 includes a direct transmission circuit 81. The direct transmission circuit 81 is connected to the AC power supply 51 and the output sides (load 52 sides) of the plurality of uninterruptible power supply modules 10.

(Disconnection Module)

Figure 2:
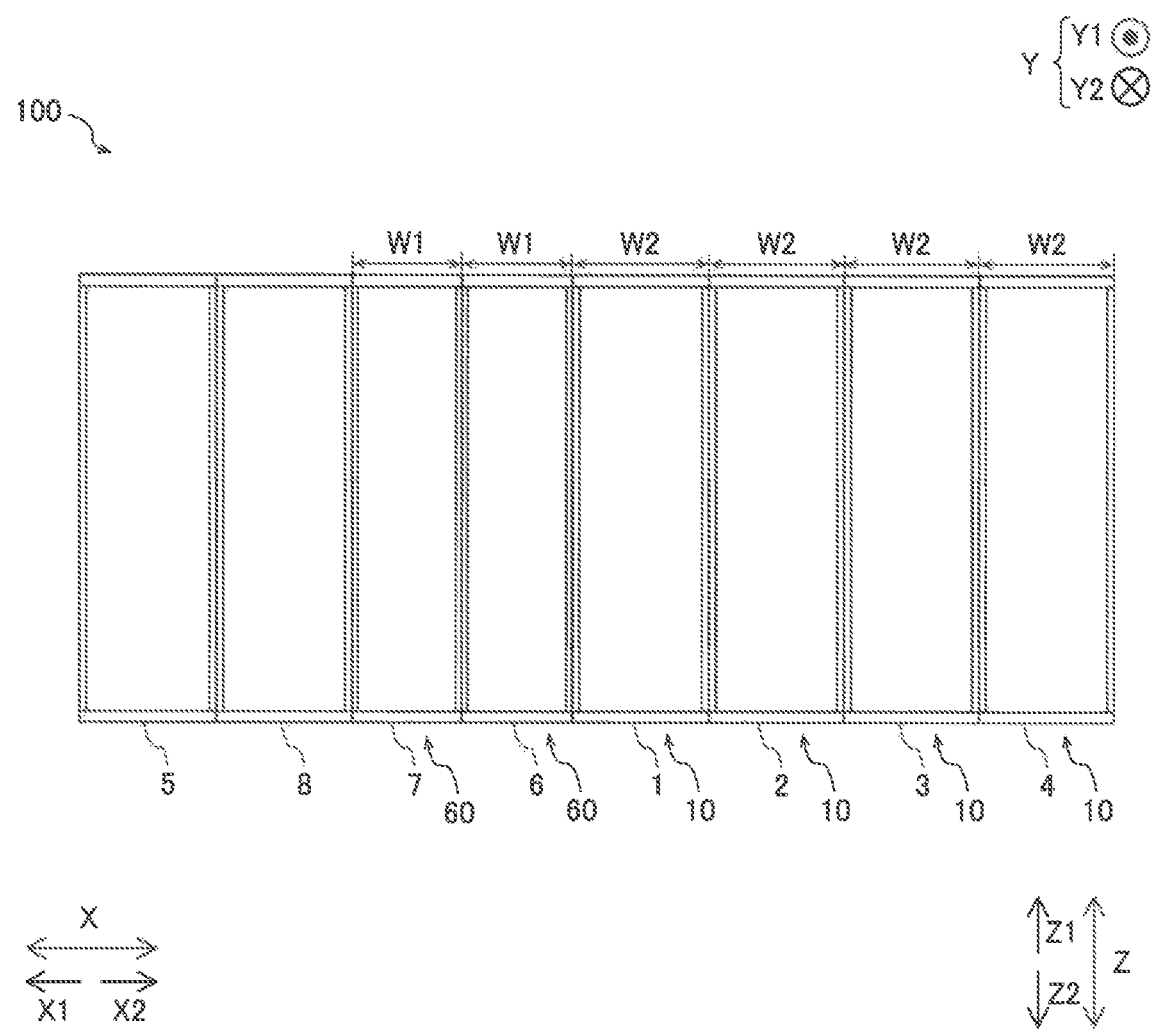
FIG. 2 is a front view schematically showing an arrangement of modules of the uninterruptible power supply according to the embodiment of the present invention.

In the present embodiment, the disconnection modules 60 (the first disconnection module 6 and the second disconnection module 7) are arranged between the plurality of uninterruptible power supply modules 10 (the first uninterruptible power supply module 1, the second uninterruptible power supply module 2, the third uninterruptible power supply module 3, and the fourth uninterruptible power supply module 4) and the input/output module 5 (see FIG. 2). Furthermore, a width W1 along an X direction per disconnection module 60 (each of the first disconnection module 6 and the second disconnection module 7) is smaller than a width W2 along the X direction per uninterruptible power supply module 10 (each of the first uninterruptible power supply module 1, the second uninterruptible power supply module 2, the third uninterruptible power supply module 3, and the fourth uninterruptible power supply module 4), as shown in FIG. 2.

(Disconnection Switch)

The first disconnection module 6 is arranged between the second disconnection module 7 and the first uninterruptible power supply module 1, and includes a housing 64 that houses the disconnection switch 9 that performs a disconnection operation to electrically disconnect each of the plurality of uninterruptible power supply modules 10 individually so as to correspond to the plurality of uninterruptible power supply modules 10 (the first uninterruptible power supply module 1 and the second uninterruptible power supply module 2), respectively. The second disconnection module 7 is arranged between the control module 8 and the first disconnection module 6, and includes a housing 74 that houses the disconnection switch 9 that performs a disconnection operation to electrically disconnect each of the plurality of uninterruptible power supply modules 10 individually so as to correspond to the plurality of uninterruptible power supply modules 10 (the third uninterruptible power supply module 3 and the fourth uninterruptible power supply module 4), respectively. The disconnection switch 9 includes disconnect switches, and is configured to disconnect (electrically disconnect) each of the plurality of uninterruptible power supply modules 10 individually by an operator (user) operation. Furthermore, the disconnection switch 9 may use a different type of switch for each switch, and may include a switch other than the disconnect switches, such as a knife switch.

The disconnection switch 9 includes AC input disconnection switches 61, AC output disconnection switches 62, and DC input disconnection switches 63, which are provided in the housing 64 of the first disconnection module 6. Furthermore, the disconnection switch 9 includes AC input disconnection switches 71, AC output disconnection switches 72, and DC input disconnection switches 73, which are provided in the housing 74 of the second disconnection module 7.

In the present embodiment, an AC input disconnection switch 61 or an AC input disconnection switch 71 is provided between the AC power supply 51 outside the uninterruptible power supply 100 and each of the plurality of uninterruptible power supply modules 10 (the first uninterruptible power supply module 1, the second uninterruptible power supply module 2, the third uninterruptible power supply module 3, and the fourth uninterruptible power supply module 4). Note that each of the AC input disconnection switch 61 and the AC input disconnection switch 71 is provided for each phase (U-phase, V-phase, and W-phase) of each uninterruptible power supply module 10. That is, three AC input disconnection switches 61 or three AC input disconnection switches 71 are provided for each uninterruptible power supply module 10. In FIGS. 1 and 3, each AC input disconnection switch 61 and each AC input disconnection switch 71 are shown collectively for three phases (U-phase, V-phase, and W-phase) for simplification.

An AC output disconnection switch 62 or an AC output disconnection switch 72 is provided on the AC output side of each of the plurality of uninterruptible power supply modules 10. Note that each of the AC output disconnection switch 62 and the AC output disconnection switch 72 is provided for each phase (U-phase, V-phase, and W-phase) of each uninterruptible power supply module 10. That is, three AC output disconnection switches 62 or three AC output disconnection switches 72 are provided for each uninterruptible power supply module 10. In FIGS. 1 and 3, each AC output disconnection switch 62 and each AC output disconnection switch 72 are shown collectively for three phases (U-phase, V-phase, and W-phase) for simplification.

A DC input disconnection switch 63 or a DC input disconnection switch 73 is provided on the DC input side of each of the plurality of uninterruptible power supply modules 10. Note that each of the DC input disconnection switch 63 and the DC input disconnection switch 73 is provided for each phase (P-phase and N-phase) of each uninterruptible power supply module 10. That is, two DC input disconnection switches 63 or two DC input disconnection switches 73 are provided for each uninterruptible power supply module 10. In FIGS. 1 and 3, each DC input disconnection switch 63 and each DC input disconnection switch 73 are shown collectively for two phases (P-phase and N-phase) for simplification.

(Connection Wiring)

Figure 3:
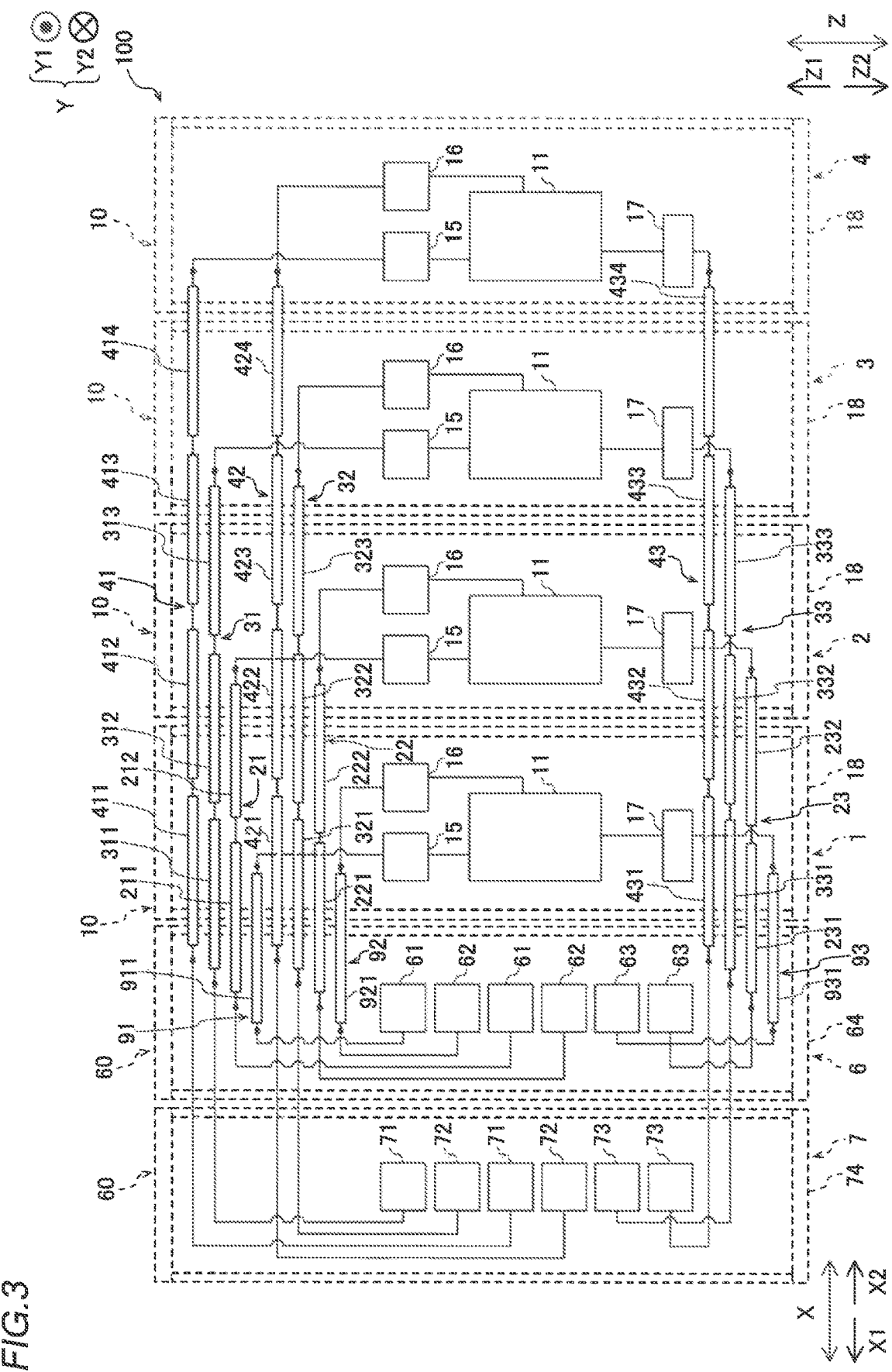
FIG. 3 is a front view schematically showing a connection between disconnection modules and uninterruptible power supply modules according to the embodiment of the present invention.

In the present embodiment, as shown in FIG. 3, the first uninterruptible power supply module 1 includes the connection wirings 91, 92, and 93 that electrically connect its power converter 11 to the disconnection switch 9 in a housing 18. The first uninterruptible power supply module 1 is an uninterruptible power supply module 10 arranged closest to the disconnection modules 60.

The power converter 11 of the first uninterruptible power supply module 1 is connected to the disconnection switch 9 provided in the first disconnection module 6 via the connection wirings 91, 92, and 93.

The connection wiring 91 is connected to wiring connected to the AC input-side switch 15 of the first uninterruptible power supply module 1 inside the first uninterruptible power supply module 1. Furthermore, the connection wiring 91 is connected to wiring connected to the AC input disconnection switch 61 inside the first disconnection module 6. Thus, the connection wiring 91 electrically connects the AC input-side switch 15 of the first uninterruptible power supply module 1 to the AC input disconnection switch 61 of the first disconnection module 6.

The connection wiring 92 is connected to wiring connected to the AC output-side switch 16 of the first uninterruptible power supply module 1 inside the first uninterruptible power supply module 1. Furthermore, the connection wiring 92 is connected to wiring connected to the AC output disconnection switch 62 inside the first disconnection module 6. Thus, the connection wiring 92 electrically connects the AC output-side switch 16 of the first uninterruptible power supply module 1 to the AC output disconnection switch 62 of the first disconnection module 6.

The connection wiring 93 is connected to wiring connected to the DC input-side switch 17 of the first uninterruptible power supply module 1 inside the first uninterruptible power supply module 1. Furthermore, the connection wiring 93 is connected to wiring connected to the DC input disconnection switch 63 inside the first disconnection module 6. Thus, the connection wiring 93 electrically connects the DC input-side switch 17 of the first uninterruptible power supply module 1 to the DC input disconnection switch 63 of the first disconnection module 6.

The connection wirings 91, 92, and 93 are provided from inside the housing 18 of the first uninterruptible power supply module 1 to inside the housing 64 of the first disconnection module 6 to connect to a corresponding disconnection switch 9 (the AC input disconnection switch 61, the AC output disconnection switch 62, and the DC input disconnection switch 63, respectively).

(Relay Wiring)

In the present embodiment, as shown in FIG. 3, the first uninterruptible power supply module 1 includes, in the housing 18, the relay wirings 21, 22, 23, 31, 32, 33, 41, 42, and 43 provided to electrically connect a plurality of remaining uninterruptible power supply modules 10 (the second uninterruptible power supply module 2, the third uninterruptible power supply module 3, and the fourth uninterruptible power supply module 4) to a plurality of disconnection switches 9. The relay wirings 21, 22, 23, 31, 32, 33, 41, 42, and 43 are provided corresponding to the uninterruptible power supply modules 10 (the second uninterruptible power supply module 2, the third uninterruptible power supply module 3, and the fourth uninterruptible power supply module 4) to be relayed.

(Relay Wiring that Connects to Second Uninterruptible Power Supply Module)

In the present embodiment, the first uninterruptible power supply module 1 includes the relay wiring 21 on the AC input side, the relay wiring 22 on the AC output side, and the relay wiring 23 on the DC input side, which are provided to electrically connect the power converter 11 of the second uninterruptible power supply module 2 to the disconnection switch 9, in the housing 18. The relay wirings 21, 22, and 23 are an example of "first relay wiring" in the claims.

The relay wiring 21 is connected to wiring connected to the AC input-side switch 15 of the second uninterruptible power supply module 2 inside the second uninterruptible power supply module 2. Furthermore, the relay wiring 21 is connected to wiring connected to the AC input disconnection switch 61 inside the first disconnection module 6. Thus, the relay wiring 21 electrically connects the AC input-side switch 15 of the second uninterruptible power supply module 2 to the AC input disconnection switch 61 of the first disconnection module 6.

The relay wiring 22 is connected to wiring connected to the AC output-side switch 16 of the second uninterruptible power supply module 2 inside the second uninterruptible power supply module 2. Furthermore, the relay wiring 22 is connected to wiring connected to the AC output disconnection switch 62 inside the first disconnection module 6. Thus, the relay wiring 22 electrically connects the AC output-side switch 16 of the second uninterruptible power supply module 2 to the AC output disconnection switch 62 of the first disconnection module 6.

The relay wiring 23 is connected to the DC input-side switch 17 of the second uninterruptible power supply module 2 inside the second uninterruptible power supply module 2. Furthermore, the relay wiring 23 is connected to wiring connected to the DC input disconnection switch 63 inside the first disconnection module 6. Thus, the relay wiring 23 electrically connects the DC input-side switch 17 of the second uninterruptible power supply module 2 to the DC input disconnection switch 63 of the first disconnection module 6.

In the present embodiment, the relay wirings 21, 22, and 23 are provided from inside a housing 18 of the second uninterruptible power supply module 2 to inside the housing 64 of the first disconnection module 6 through inside the housing 18 of the first uninterruptible power supply module 1 to connect to a corresponding disconnection switch 9 (the AC input disconnection switch 61, the AC output disconnection switch 62, and the DC input disconnection switch 63).

(Relay Wiring that Connects to Third Uninterruptible Power Supply Module)

In the present embodiment, the first uninterruptible power supply module 1 includes the relay wiring 31 on the AC input side, the relay wiring 32 on the AC output side, and the relay wiring 33 on the DC input side, which are provided to electrically connect the power converter 11 of the third uninterruptible power supply module 3 to the disconnection switch 9, in the housing 18. The relay wirings 31, 32, and 33 are an example of "second relay wiring" in the claims.

The relay wiring 31 is connected to wiring connected to the AC input-side switch 15 of the third uninterruptible power supply module 3 inside the third uninterruptible power supply module 3. Furthermore, the relay wiring 31 is connected to wiring connected to the AC input disconnection switch 71 of the second disconnection module 7 inside the first disconnection module 6. Thus, the relay wiring 31 electrically connects the AC input-side switch 15 of the third uninterruptible power supply module 3 to the AC input disconnection switch 71 of the second disconnection module 7.

The relay wiring 32 is connected to wiring connected to the AC output-side switch 16 of the third uninterruptible power supply module 3 inside the third uninterruptible power supply module 3. Furthermore, the relay wiring 32 is connected to wiring connected to the AC output disconnection switch 72 of the second disconnection module 7 inside the first disconnection module 6. Thus, the relay wiring 32 electrically connects the AC output-side switch 16 of the third uninterruptible power supply module 3 to the AC output disconnection switch 72 of the second disconnection module 7.

The relay wiring 33 is connected to wiring connected to the DC input-side switch 17 of the third uninterruptible power supply module 3 inside the third uninterruptible power supply module 3. Furthermore, the relay wiring 33 is connected to wiring connected to the DC input disconnection switch 73 of the second disconnection module 7 inside the first disconnection module 6. Thus, the relay wiring 33 electrically connects the DC input-side switch 17 of the third uninterruptible power supply module 3 to the DC input disconnection switch 73 of the second disconnection module 7.

In the present embodiment, the relay wirings 31, 32, and 33 are provided from inside a housing 18 of the third uninterruptible power supply module 3 to inside the housing 64 of the first disconnection module 6 through inside the housing 18 of the second uninterruptible power supply module 2 and inside the housing 18 of the first uninterruptible power supply module 1 to connect to a corresponding disconnection switch 9 (the AC input disconnection switch 71, the AC output disconnection switch 72, and the DC input disconnection switch 73).

(Relay Wiring that Connect to Fourth Uninterruptible Power Supply Module)

In the present embodiment, the first uninterruptible power supply module 1 includes the relay wiring 41 on the AC input side, the relay wiring 42 on the AC output side, and the relay wiring 43 on the DC input side, which are provided to electrically connect the power converter 11 of the fourth uninterruptible power supply module 4 to the disconnection switch 9, in the housing 18. The relay wirings 41, 42, and 43 are an example of "third relay wiring" in the claims. The fourth uninterruptible power supply module 4 is an uninterruptible power supply module 10 arranged on the side of the third uninterruptible power supply module 3 opposite to the side on which the second uninterruptible power supply module 2 is arranged.

The relay wiring 41 is connected to wiring connected to the AC input-side switch 15 of the fourth uninterruptible power supply module 4 inside the fourth uninterruptible power supply module 4. Furthermore, the relay wiring 41 is connected to wiring connected to the AC input disconnection switch 71 of the second disconnection module 7 inside the first disconnection module 6. Thus, the relay wiring 41 electrically connects the AC input-side switch 15 of the fourth uninterruptible power supply module 4 to the AC input disconnection switch 71 of the second disconnection module 7.

The relay wiring 42 is connected to wiring connected to the AC output-side switch 16 of the fourth uninterruptible power supply module 4 inside the fourth uninterruptible power supply module 4. Furthermore, the relay wiring 42 is connected to wiring connected to the AC output disconnection switch 72 of the second disconnection module 7 inside the first disconnection module 6. Thus, the relay wiring 42 electrically connects the AC output-side switch 16 of the fourth uninterruptible power supply module 4 to the AC output disconnection switch 72 of the second disconnection module 7.

The relay wiring 43 is connected to wiring connected to the DC input-side switch 17 of the fourth uninterruptible power supply module 4 inside the fourth uninterruptible power supply module 4. Furthermore, the relay wiring 43 is connected to wiring connected to the DC input disconnection switch 73 of the second disconnection module 7 inside the first disconnection module 6. Thus, the relay wiring 43 electrically connects the DC input-side switch 17 of the fourth uninterruptible power supply module 4 to the DC input disconnection switch 73 of the second disconnection module 7.

In the present embodiment, the relay wirings 41, 42, and 43 are provided from inside a housing 18 of the fourth uninterruptible power supply module 4 to inside the housing 64 of the first disconnection module 6 through inside the housing 18 of the third uninterruptible power supply module 3, inside the housing 18 of the second uninterruptible power supply module 2, and inside the housing 18 of the first uninterruptible power supply module 1 to connect to a corresponding disconnection switch 9 (the AC input disconnection switch 71, the AC output disconnection switch 72, and the DC input disconnection switch 73).

In the present embodiment, the first disconnection module 6 is connected to some of the plurality of uninterruptible power supply modules 10, and the second disconnection module 7 is connected to the remaining uninterruptible power supply modules 10. As described above, the first uninterruptible power supply module 1 is electrically connected to the first disconnection module 6 via the connection wirings 91, 92, and 93. Furthermore, the second uninterruptible power supply module 2 is electrically connected to the first disconnection module 6 via the relay wirings 21, 22, and 23.

The third uninterruptible power supply module 3 is electrically connected to the second disconnection module 7 via the relay wirings 31, 32, and 33. Furthermore, the fourth uninterruptible power supply module 4 is electrically connected to the second disconnection module 7 via the relay wirings 41, 42, and 43.

Each of the connection wiring 91, the relay wiring 21, the relay wiring 31, and the relay wiring 41 is electrically connected to the disconnection switch 9 on the AC input side (the AC input disconnection switch 61 or 71) of the disconnection module 60 (the first disconnection module 6 or the second disconnection module 7), and is configured to transmit input AC power to the corresponding disconnection module 60 via the disconnection switch 9.

Each of the connection wiring 92, the relay wiring 22, the relay wiring 32, and the relay wiring 42 is electrically connected to the disconnection switch 9 (the AC output disconnection switch 62 or 72) on the AC output side of the disconnection module 60 (the first disconnection module 6 or the second disconnection module 7), and is configured to supply AC power from the corresponding AC output-side switch 16 to the load 52 via the disconnection switch 9.

Each of the connection wiring 93, the relay wiring 23, the relay wiring 33, and the relay wiring 43 is electrically connected to the disconnection switch 9 on the DC input side (the DC input disconnection switch 63 or 73) of the disconnection module 60 (the first disconnection module 6 or the second disconnection module 7), and is configured to transmit input DC power to the corresponding disconnection module 60 via the disconnection switch 9.

As shown in FIG. 3, the connection wiring 91, the relay wiring 21, the relay wiring 31, the relay wiring 41, the connection wiring 92, the relay wiring 22, the relay wiring 32, and the relay wiring 42 are arranged in an upper portion (above the AC input-side switch 15 and the AC output-side switch 16) of the uninterruptible power supply module 10 inside the housing 18. The AC input-side switch 15 and the AC output-side switch 16 are arranged above the power converter 11. The DC input-side switch 17 is arranged below the power converter 11.

The connection wiring 91, the relay wiring 21, the relay wiring 31, and the relay wiring 41 are arranged above the connection wiring 92, the relay wiring 22, the relay wiring 32, and the relay wiring 42. The connection wiring 93, the relay wiring 23, the relay wiring 33, and the relay wiring 43 are arranged in a lower portion (below the DC input-side switch 17) of the uninterruptible power supply module 10.

The connection wirings 91, 92, and 93 are arranged at positions accessible from the front side (arrow Y1 direction side) of the housing 18. Furthermore, the relay wirings 21, 22, 23, 31, 32, 33, 41, 42, and 43 are arranged at positions accessible from the front side (arrow Y1 direction side) of the housing 18. The positions accessible from the front side of the housing 18 refer to positions in a region corresponding to the length of a general operator's arm from the front end of the housing 18 toward the inside of the housing 18. That is, the user (operator) can attach and maintain the connection wiring 91, the connection wiring 92, the connection wiring 93, the relay wiring 21, the relay wiring 22, the relay wiring 23, the relay wiring 31, the relay wiring 32, the relay wiring 33, the relay wiring 41, the relay wiring 42, and the relay wiring 43 from the front side of the housing 18. The "front side" denotes a side opposite to the wall side (rear side) of the uninterruptible power supply 100 when the uninterruptible power supply 100 is arranged near a wall, for example.

The housing 18 includes an openable and closable front door (not shown) to be exposed on the front side (arrow Y1 direction side). The connection wiring 91, the connection wiring 92, the connection wiring 93, the relay wiring 21, the relay wiring 22, the relay wiring 23, the relay wiring 31, the relay wiring 32, the relay wiring 33, the relay wiring 41, the relay wiring 42, and the relay wiring 43 are arranged at the positions accessible from the front side of the housing 18 with the front door opened.

(Detailed Structure of Connection Wiring and Relay Wiring on AC Input Side)

Figure 4:
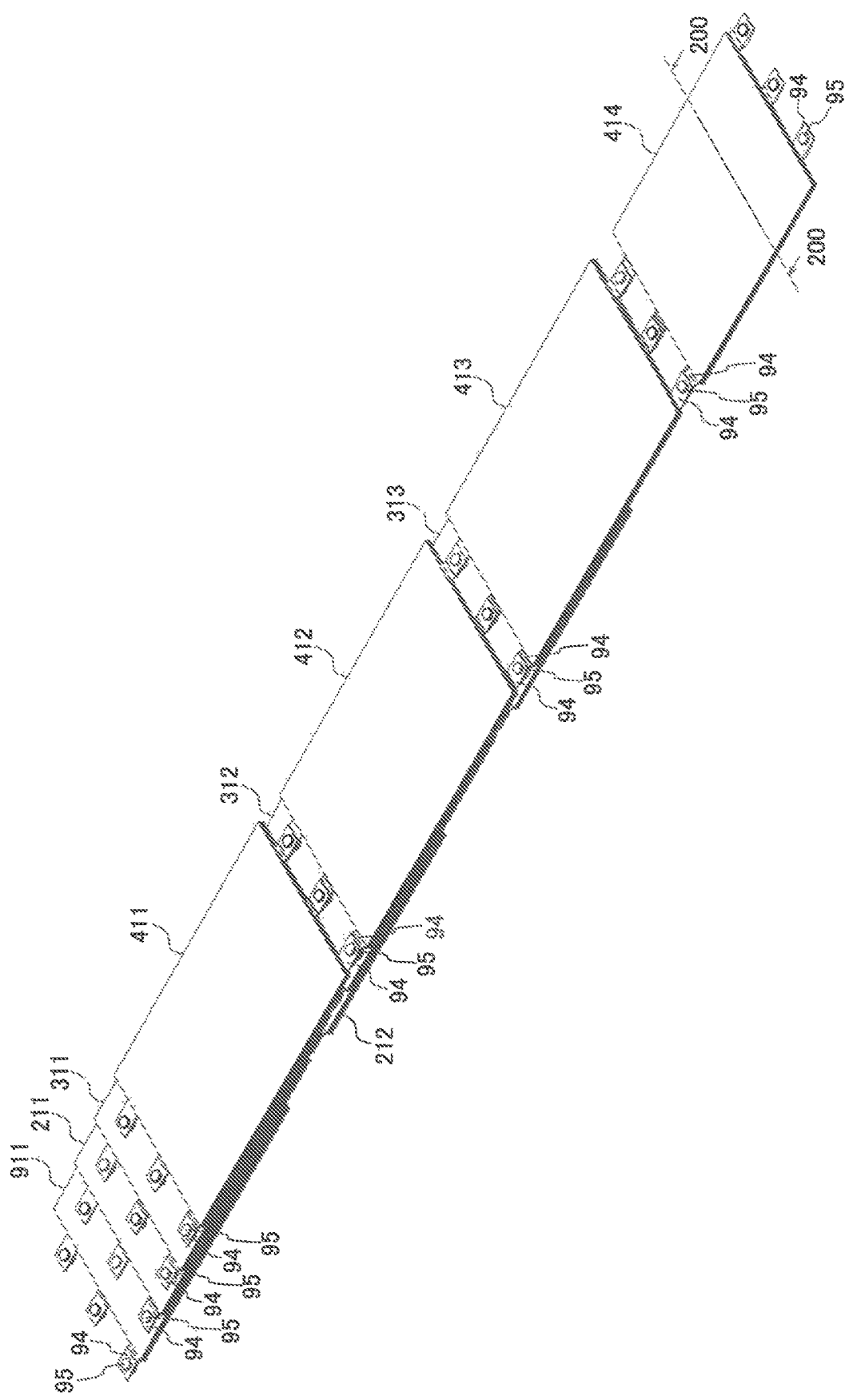
FIG. 4 is a perspective view of connection wiring and relay wiring on the AC input side in the uninterruptible power supply according to the embodiment of the present invention.
Figure 5:
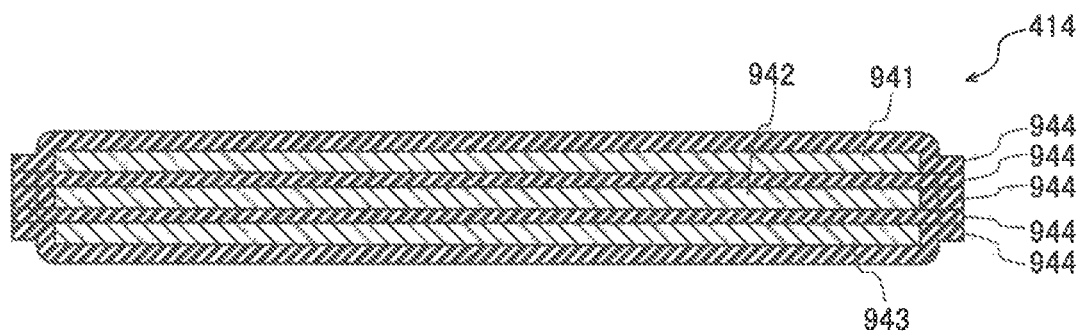
FIG. 5 is a sectional view taken along the line 200-200 in FIG. 4.

The detailed structure of the connection wiring 91, the relay wiring 21, the relay wiring 31, and the relay wiring 41 connected to the disconnection modules 60 is now described with reference to FIGS. 4 and 5.

In the present embodiment, the connection wiring 91, the relay wiring 21, the relay wiring 31, and the relay wiring 41 include laminated bus bars in which a plurality of plate-shaped conductors (conductors 941, 942, and 943) and insulators 944 that cover the plurality of plate-shaped conductors (conductors 941, 942, and 943) are stacked.

In the present embodiment, the connection wiring 91 includes a laminated bus bar 911. The relay wiring 21 is configured by connecting a laminated bus bar 211 and a laminated bus bar 212. The relay wiring 31 is configured by connecting a laminated bus bar 311, a laminated bus bar 312, and a laminated bus bar 313. The relay wiring 41 is configured by connecting a laminated bus bar 411, a laminated bus bar 412, a laminated bus bar 413, and a laminated bus bar 414.

The laminated bus bars 211, 212, 311, 312, 313, 411, 412, 413, 414, and 911 are configured by stacking the three plate-shaped conductors 941, 942, and 943 and the insulators 944 that cover the plate-shaped conductors 941, 942, and 943 (see FIG. 5), and the plate-shaped conductors 941, 942, and 943 correspond to the U-phase, the V-phase, and the W-phase, respectively.

Each of the laminated bus bars 211, 212, 311, 312, 313, 411, 412, 413, 414, and 911 includes connection terminals 94 (see FIG. 4) that electrically connects wiring connected to the disconnection switch 9 on the AC input side (the AC input disconnection switch 61 or the AC input disconnection switch 71) inside the disconnection module 60 to wiring connected to the AC input-side switch 15 inside the uninterruptible power supply module 10. The connection terminals 94 can be electrically connected to the wiring connected to the disconnection switch 9 inside the disconnection module 60 or the wiring connected to the AC input-side switch 15 inside the uninterruptible power supply module 10 by fastening bolts 95.

The connection terminals 94 also connect the laminated bus bars arranged adjacent to each other. The connection terminals 94 of the laminated bus bars 211, 212, 311, 312, 313, 411, 412, 413, and 414 arranged adjacent to each other are fastened by the bolts 95 such that the laminated bus bars 211, 212, 311, 312, 313, 411, 412, 413, and 414 arranged adjacent to each other are connected to each other.

One connection terminal 94 is provided at each end in a direction in which the laminated bus bars of the conductors 941, 942, and 943 provided corresponding to the U-phase, the V-phase, and the W-phase are adjacent to each other. That is, each of the conductors 941, 942, and 943 is provided with two connection terminals 94, and each of the laminated bus bars 211, 212, 311, 312, 313, 411, 412, 413, 414, and 911 is provided with a total of six connection terminals 94.

In the present embodiment, the connection wiring 91, the relay wiring 21, the relay wiring 31, and the relay wiring 41 overlap each other in a plan view (as viewed in a Z direction). As shown in FIG. 4, in a state in which the connection wiring 91, the relay wiring 21, the relay wiring 31, and the relay wiring 41 overlap each other in the plan view, the connection terminals 94 of the connection wiring 91, the relay wiring 21, the relay wiring 31, and the relay wiring 41 are horizontally shifted so as not to contact the connection terminals 94 of another laminated bus bar (laminated bus bar having a different connection destination) arranged above or below.

(Detailed Structure of Connection Wiring and Relay Wiring on AC Output Side)

Figure 6:
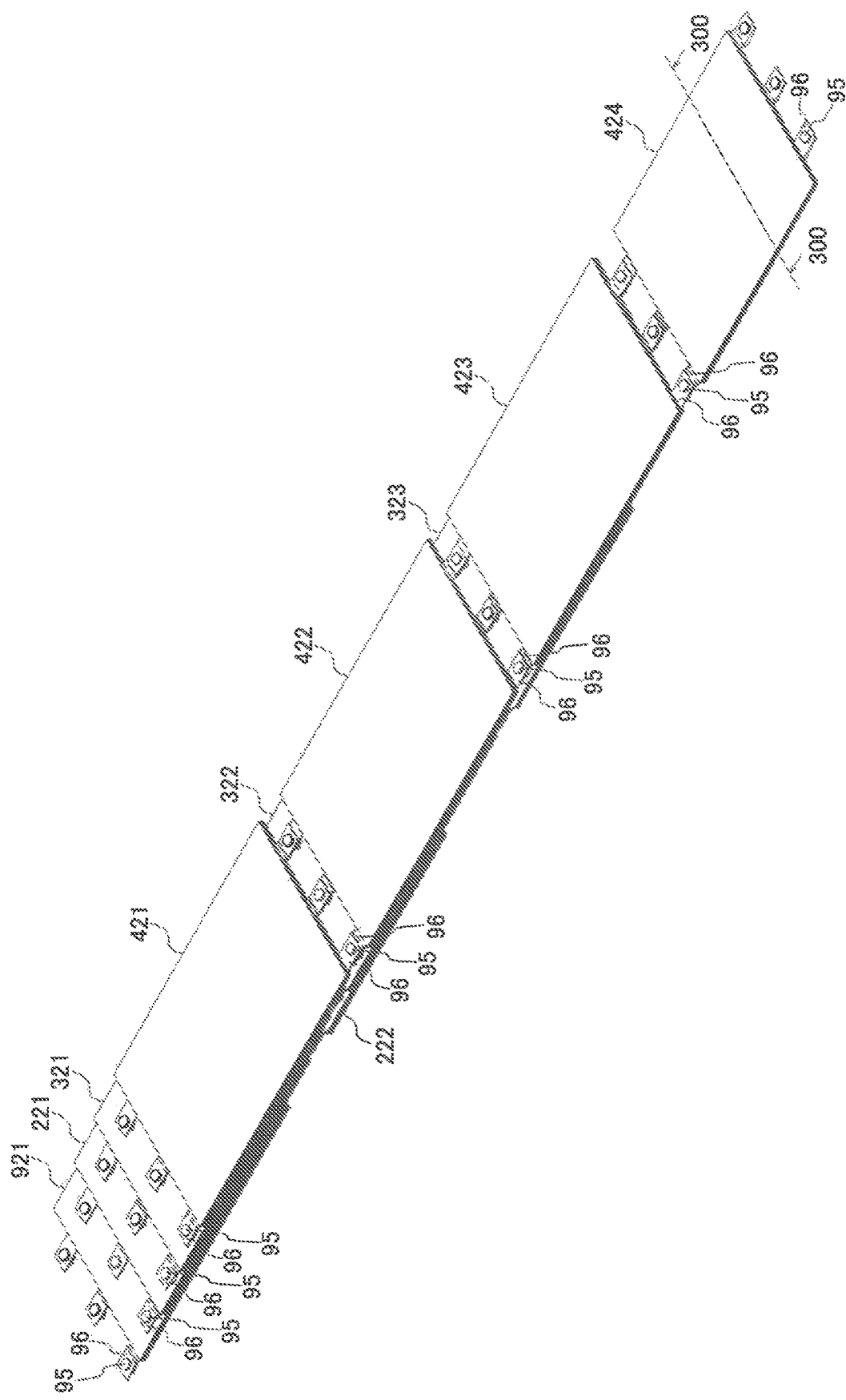
FIG. 6 is a perspective view of connection wiring and relay wiring on the AC output side in the uninterruptible power supply according to the embodiment of the present invention.
Figure 7:
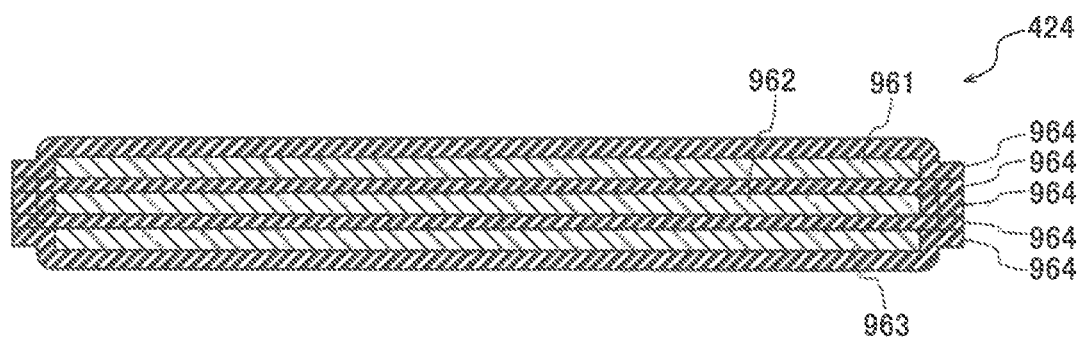
FIG. 7 is a sectional view taken along the line 300-300 in FIG. 6.

The detailed structure of the connection wiring 92, the relay wiring 22, the relay wiring 32, and the relay wiring 42 connected to the disconnection modules 60 is now described with reference to FIGS. 6 and 7.

In the present embodiment, the connection wiring 92, the relay wiring 22, the relay wiring 32, and the relay wiring 42 include laminated bus bars in which a plurality of plate-shaped conductors (conductors 961, 962, and 963) and insulators 964 that cover the plurality of plate-shaped conductors (conductors 961, 962, and 963) are stacked.

In the present embodiment, the connection wiring 92 includes a laminated bus bar 921. The relay wiring 22 is configured by connecting a laminated bus bar 221 and a laminated bus bar 222. The relay wiring 32 is configured by connecting a laminated bus bar 321, a laminated bus bar 322, and a laminated bus bar 323. The relay wiring 42 is configured by connecting a laminated bus bar 421, a laminated bus bar 422, a laminated bus bar 423, and a laminated bus bar 424.

The laminated bus bars 221, 222, 321, 322, 323, 421, 422, 423, 424, and 921 are configured by stacking the three plate-shaped conductors 961, 962, and 963 and the insulators 964 that cover the plate-shaped conductors 961, 962, and 963 (see FIG. 7), and the plate-shaped conductors 961, 962, and 963 correspond to the U-phase, the V-phase, and the W-phase, respectively.

Each of the laminated bus bars 221, 222, 321, 322, 323, 421, 422, 423, 424, and 921 includes connection terminals 96 (see FIG. 6) that electrically connects wiring connected to the disconnection switch 9 on the AC output side (the AC output disconnection switch 62 or the AC output disconnection switch 72) inside the disconnection module 60 to wiring connected to the AC output-side switch 16 inside the uninterruptible power supply module 10. The connection terminals 96 can be electrically connected to the wiring connected to the disconnection switch 9 inside the disconnection module 60 or the wiring connected to the AC output-side switch 16 inside the uninterruptible power supply module 10 by fastening the bolts 95.

The connection terminals 96 also connect the laminated bus bars arranged adjacent to each other. The connection terminals 96 of the laminated bus bars 221, 222, 321, 322, 323, 421, 422, 423, and 424 arranged adjacent to each other are fastened by the bolts 95 such that the laminated bus bars 221, 222, 321, 322, 323, 421, 422, 423, and 424 arranged adjacent to each other are connected to each other.

One connection terminal 96 is provided at each end in a direction in which the laminated bus bars of the conductors 961, 962, and 963 provided corresponding to the U-phase, the V-phase, and the W-phase are adjacent to each other. That is, each of the conductors 961, 962, and 963 is provided with two connection terminals 96, and each of the laminated bus bars 221, 222, 321, 322, 323, 421, 422, 423, 424, and 921 is provided with a total of six connection terminals 96.

In the present embodiment, the connection wiring 92, the relay wiring 22, the relay wiring 32, and the relay wiring 42 overlap each other in a plan view. As shown in FIG. 6, in a state in which the connection wiring 92, the relay wiring 22, the relay wiring 32, and the relay wiring 42 overlap each other in the plan view, the connection terminals 96 of the connection wiring 92, the relay wiring 22, the relay wiring 32, and the relay wiring 42 are horizontally shifted so as not to contact the connection terminals 96 of another laminated bus bar (laminated bus bar having a different connection destination) arranged above or below.

(Detailed Structure of Connection Wiring and Relay Wiring on DC Input Side)

Figure 8:
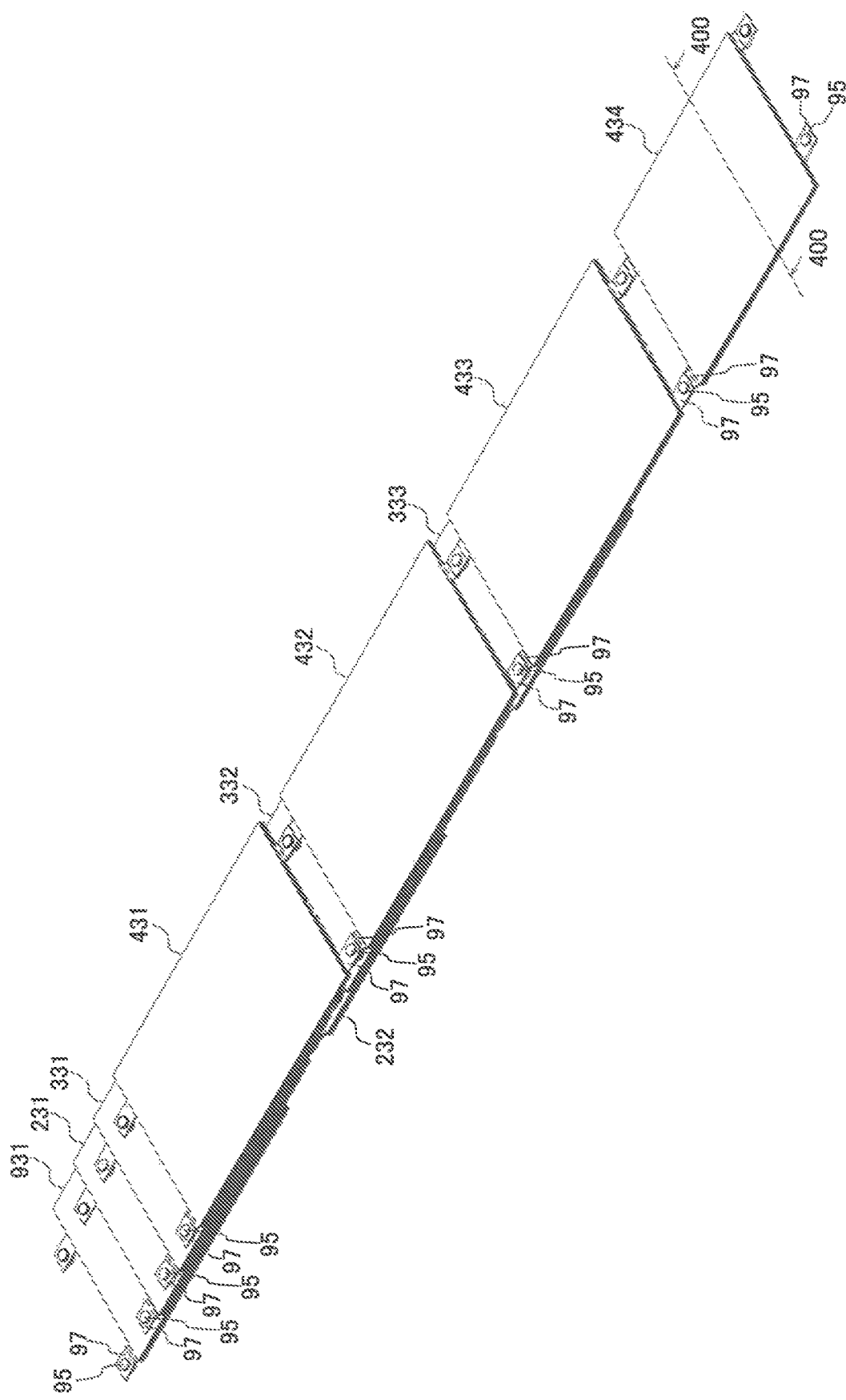
FIG. 8 is a perspective view of connection wiring and relay wiring on the DC input side in the uninterruptible power supply according to the embodiment of the present invention.
Figure 9:
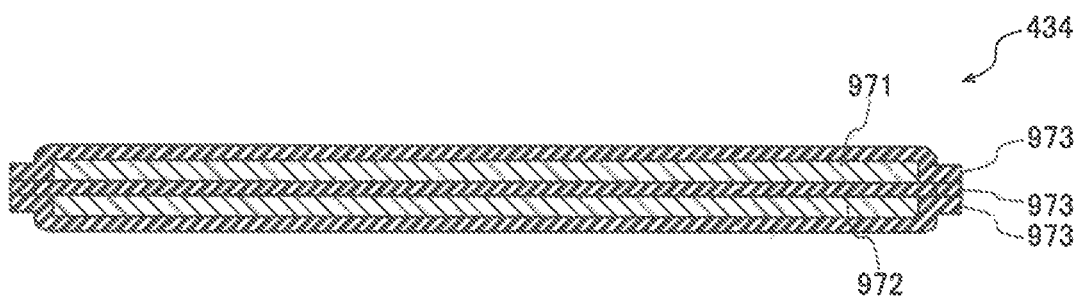
FIG. 9 is a sectional view taken along the line 400-400 in FIG. 8.

The detailed structure of the connection wiring 93, the relay wiring 23, the relay wiring 33, and the relay wiring 43 connected to the disconnection modules 60 is now described with reference to FIGS. 8 and 9.

In the present embodiment, the connection wiring 93, the relay wiring 23, the relay wiring 33, and the relay wiring 43 include laminated bus bars in which a plurality of plate-shaped conductors (conductors 971 and 972) and insulators 973 that cover the plurality of plate-shaped conductors (conductors 971 and 972) are stacked.

In the present embodiment, the connection wiring 93 includes a laminated bus bar 931. The relay wiring 23 is configured by connecting a laminated bus bar 231 and a laminated bus bar 232. The relay wiring 33 is configured by connecting a laminated bus bar 331, a laminated bus bar 332, and a laminated bus bar 333. The relay wiring 43 is configured by connecting a laminated bus bar 431, a laminated bus bar 432, a laminated bus bar 433, and a laminated bus bar 434.

The laminated bus bars 231, 232, 331, 332, 333, 431, 432, 433, 434, and 931 are configured by stacking the two plate-shaped conductors 971 and 972 and the insulators 973 that cover the plate-shaped conductors 971 and 972 (see FIG. 9), and the plate-shaped conductors 971 and 972 correspond to the P-phase and the N-phase, respectively.

Each of the laminated bus bars 231, 232, 331, 332, 333, 431, 432, 433, 434, and 931 includes connection terminals 97 (see FIG. 8) that electrically connect wiring connected to the disconnection switch 9 on the DC input side (the DC input disconnection switch 63 or the DC input disconnection switch 73) inside the disconnection module 60 to wiring connected to the DC input-side switch 17 inside the uninterruptible power supply module 10. The connection terminals 97 can be electrically connected to the wiring connected to the disconnection switch 9 inside the disconnection module 60 or the wiring connected to the DC input-side switch 17 inside the uninterruptible power supply module 10 by fastening the bolts 95.

The connection terminals 97 also connect the laminated bus bars arranged adjacent to each other. The connection terminals 97 of the laminated bus bars 231, 232, 331, 332, 333, 431, 432, 433, and 434 arranged adjacent to each other are fastened by the bolts 95 such that the laminated bus bars 231, 232, 331, 332, 333, 431, 432, 433, and 434 arranged adjacent to each other are connected to each other.

One connection terminal 97 is provided at each end in a direction in which the laminated bus bars of the conductors 971 and 972 provided corresponding to the P-phase and the N-phase are adjacent to each other. That is, each of the conductors 971 and 972 is provided with two connection terminals 97, and each of the laminated bus bars 231, 232, 331, 332, 333, 431, 432, 433, 434, and 931 is provided with a total of four connection terminals 97.

In the present embodiment, the connection wiring 93, the relay wiring 23, the relay wiring 33, and the relay wiring 43 overlap each other in a plan view. As shown in FIG. 8, in a state in which the connection wiring 93, the relay wiring 23, the relay wiring 33, and the relay wiring 43 overlap each other in the plan view, the connection terminals 97 of the connection wiring 93, the relay wiring 23, the relay wiring 33, and the relay wiring 43 are horizontally shifted so as not to contact the connection terminals 97 of another laminated bus bar (laminated bus bar having a different connection destination) arranged above or below.

(Advantageous Effects of Present Embodiment)

According to the present embodiment, the following advantageous effects are achieved.

According to the present embodiment, as described above, the disconnection modules 60 (the first disconnection module 6 and the second disconnection module 7) are arranged between the plurality of uninterruptible power supply modules 10 and the input/output module 5, and include the housing 64 and the housing 74 in which the disconnection switches 9 that perform a disconnection operation to electrically disconnect each of the plurality of uninterruptible power supply modules 10 individually are housed. Accordingly, the entirety of the uninterruptible power supply modules 10 can be electrically disconnected for each uninterruptible power supply module 10 by the disconnection switches 9 housed in the housings (housings 64 and 74) of the disconnection modules 60 (the first disconnection module 6 and the second disconnection module 7), and thus all components of the uninterruptible power supply module 10 to be maintained can be maintained and replaced without stopping power supply from the AC power supply 51 and completely stopping power supply from the uninterruptible power supply modules 10 on which maintenance is not performed. Consequently, it is possible to provide the uninterruptible power supply 100 in which all components of the uninterruptible power supply module 10 to be maintained can be maintained and replaced while power is supplied from the uninterruptible power supply modules 10 on which maintenance is not performed when maintenance is performed on the uninterruptible power supply module 10.

According to the present embodiment, as described above, the housings (the housing 64 and the housing 74) of the disconnection modules 60 (the first disconnection module 6 and the second disconnection module 7) house the plurality of disconnection switches 9 that performs a disconnection operation individually on each of the plurality of uninterruptible power supply modules 10 so as to correspond to the plurality of uninterruptible power supply modules 10, respectively. Accordingly, the plurality of disconnection switches 9 is provided for each of the uninterruptible power supply modules 10, and thus the disconnection operation for each of the plurality of uninterruptible power supply modules 10 can be reliably performed.

According to the present embodiment, as described above, the disconnection switches 9 include the AC input disconnection switches 61, the AC input disconnection switches 71, the AC output disconnection switches 62, the AC output disconnection switches 72, the DC input disconnection switches 63, and the DC input disconnection switches 73. Accordingly, on each of the AC input side, the AC output side, and the DC input side, the disconnection switches 9 (the AC input disconnection switches 61, the AC input disconnection switches 71, the AC output disconnection switches 62, the AC output disconnection switches 72, the DC input disconnection switches 63, and the DC input disconnection switches 73) are provided, and thus the disconnection operation can be performed on each of the AC input side, the AC output side, and the DC input side.

According to the present embodiment, as described above, the plurality of uninterruptible power supply modules 10 (the first uninterruptible power supply module 1, the second uninterruptible power supply module 2, the third uninterruptible power supply module 3, and the fourth uninterruptible power supply module 4) is arranged adjacent to each other, and the relay wirings 21, 22, 23, 31, 32, 33, 41, 42, and 43 are provided corresponding to the uninterruptible power supply modules 10 (the second uninterruptible power supply module 2, the third uninterruptible power supply module 3, and the fourth uninterruptible power supply module 4) to be relayed in the first uninterruptible power supply module 1. Accordingly, the first uninterruptible power supply module 1 includes the relay wirings 21, 22, 23, 31, 32, 33, 41, 42, and 43 provided to electrically connect the plurality of remaining uninterruptible power supply modules 10 (the second uninterruptible power supply module 2, the third uninterruptible power supply module 3, and the fourth uninterruptible power supply module 4) to the plurality of disconnection switches 9 such that the remaining uninterruptible power supply modules 10 (the second uninterruptible power supply module 2, the third uninterruptible power supply module 3, and the fourth uninterruptible power supply module 4) can electrically connect to the disconnection modules 60 simply by electrically connecting to the relay wirings 21, 22, 23, 31, 32, 33, 41, 42, and 43 of the first uninterruptible power supply module 1. Consequently, as compared with a case in which the first uninterruptible power supply module 1 does not include the relay wirings 21, 22, 23, 31, 32, 33, 41, 42, and 43, the remaining uninterruptible power supply modules 10 can easily electrically connect to the disconnection modules 60.

According to the present embodiment, as described above, the first uninterruptible power supply module 1 includes the relay wirings 21, 22, and 23 that connect the second uninterruptible power supply module 2 to the disconnection switch 9, and the first uninterruptible power supply module 1 and the second uninterruptible power supply module 2 include the relay wirings 31, 32, and 33 that connect the third uninterruptible power supply module 3 to the disconnection switch 9. Accordingly, the first uninterruptible power supply module 1 includes the relay wirings 21, 22, and 23 such that the second uninterruptible power supply module 2 can electrically connect to the disconnection module 60 simply by electrically connecting to the relay wirings 21, 22, and 23. Furthermore, the first uninterruptible power supply module 1 and the second uninterruptible power supply module 2 include the relay wirings 31, 32, and 33 such that the third uninterruptible power supply module 3 can electrically connect to the disconnection module 60 simply by electrically connecting to the relay wirings 31, 32, and 33. Consequently, as compared with a case in which the first uninterruptible power supply module 1 does not include the relay wirings 21, 22, and 23, and the first uninterruptible power supply module 1 and the second uninterruptible power supply module 2 do not include the relay wirings 31, 32, and 33, the second uninterruptible power supply module 2 and the third uninterruptible power supply module 3 can easily electrically connect to the disconnection modules 60.

According to the present embodiment, as described above, the first uninterruptible power supply module 1, the second uninterruptible power supply module 2, and the third uninterruptible power supply module 3 include the relay wirings 41, 42, and 43 that connect, to the disconnection switch 9, the fourth uninterruptible power supply module 4 arranged on the side of the third uninterruptible power supply module 3 opposite to the side on which the second uninterruptible power supply module 2 is arranged. Accordingly, when the fourth uninterruptible power supply module 4 is arranged, the fourth uninterruptible power supply module 4 can electrically connect to the disconnection module 60 by connecting to the relay wirings 41, 42, and 43 provided in advance. Thus, when the fourth uninterruptible power supply module 4 is arranged, the fourth uninterruptible power supply module 4 can be easily added as compared with a case in which wiring that electrically connects the fourth uninterruptible power supply module 4 to the disconnection module 60 is newly provided.

According to the present embodiment, as described above, the connection wiring (connection wirings 91, 92, and 93) and the relay wiring (relay wirings 21, 22, 23, 31, 32, 33, 41, 42, and 43) include the laminated bus bars in which the plurality of plate-shaped conductors and the insulators that cover the plurality of plate-shaped conductors are stacked, the connection wirings 91, 92, and 93 include one laminated bus bar, the relay wirings 21, 22, and 23 include two laminated bus bars connected to each other, the relay wirings 31, 32, and 33 include three laminated bus bars connected to each other, and the connection wiring (connection wirings 91, 92, and 93), the relay wiring (relay wirings 21, 22, and 23) connected to the second uninterruptible power supply module 2, and the relay wiring (relay wirings 31, 32, and 33) connected to the third uninterruptible power supply module 3 overlap each other in the plan view. Accordingly, the connection wiring 91, the connection wiring 92, the connection wiring 93, the relay wiring 21, the relay wiring 22, the relay wiring 23, the relay wiring 31, the relay wiring 32, and the relay wiring 33 can overlap each other in a state insulated from each other, and thus even when an arrangement space is small, the connection wiring 91, the connection wiring 92, the connection wiring 93, the relay wiring 21, the relay wiring 22, the relay wiring 23, the relay wiring 31, the relay wiring 32, and the relay wiring 33 can be easily arranged.

Furthermore, the relay wirings 21, 22, 23, 31, 32, and 33 include the plurality of laminated bus bars connected to each other, and thus the relay wirings 21, 22, 23, 31, 32, and 33 can be detached and attached at a laminated bus bar connection point. Thus, as compared with a case in which the relay wirings 21, 22, 23, 31, 32, and 33 include one laminated bus bar, the number of detachable and attachable locations can be increased. Consequently, when the uninterruptible power supply modules 10 are detached or added, the relay wirings 21, 22, 23, 31, 32, and 33 can be easily detached and attached.

According to the present embodiment, as described above, the first disconnection module 6 is connected to some (the first uninterruptible power supply module 1 and the second uninterruptible power supply module 2) of the plurality of uninterruptible power supply modules 10, and the second disconnection module 7 is connected to the remaining uninterruptible power supply modules 10 (the third uninterruptible power supply module 3 and the fourth uninterruptible power supply module 4). Accordingly, the uninterruptible power supply modules 10 are connected to the first disconnection module 6 or the second disconnection module 7, and thus even when a failure occurs in one of the disconnection modules 60, and power cannot be supplied using the uninterruptible power supply modules 10 connected to the disconnection module 60 in which a failure occurs, power can be supplied using the uninterruptible power supply modules 10 connected to the other of the disconnection modules 60.

According to the present embodiment, as described above, the width W1 per disconnection module 60 (each of the first disconnection module 6 and the second disconnection module 7) is smaller than the width W2 per uninterruptible power supply module 10. Accordingly, the width W1 per disconnection module 60 is smaller than the width W2 per uninterruptible power supply module 10, and thus even when the disconnection modules 60 (the first disconnection module 6 and the second disconnection module 7) are provided, an increase in the width of the entire uninterruptible power supply 100 can be significantly reduced or prevented as compared with a case in which the width W1 per disconnection module 60 is larger than or equal to the width W2 per uninterruptible power supply module 10.

Modified Examples

The embodiment disclosed this time must be considered as illustrative in all points and not restrictive. The scope of the present invention is not shown by the above description of the embodiment but by the scope of claims for patent, and all modifications (modified examples) within the meaning and scope equivalent to the scope of claims for patent are further included.

For example, while the AC input side connection wiring 91, the AC input side relay wirings 21, 31, and 41, the AC output side connection wiring 92, and the AC output side relay wirings 22, 32, and 42 are arranged in the upper portion of the uninterruptible power supply module 10 in the housing 18, and the DC input side connection wiring 93 and the DC input side relay wirings 23, 33, and 43 are arranged in the lower portion of the uninterruptible power supply module 10 in the housing 18 in the aforementioned embodiment, the present invention is not restricted to this. In the present invention, for example, the connection wiring on the DC input side and the relay wiring on the DC input side may alternatively be arranged in the upper portion of the uninterruptible power supply module, or the connection wiring on the AC input side, the relay wiring on the AC input side, the connection wiring on the AC output side, and the relay wiring on the AC output side may alternatively be arranged in the lower portion of the uninterruptible power supply module. In this case, the AC input-side switches and the AC output-side switches are arranged below the power converter, and the DC input-side switches are arranged above the power converter.

While the connection wiring 91 on the AC input side, the relay wirings 21, 31, and 41 on the AC input side, the connection wiring 92 on the AC output side, and the relay wirings 22, 32, and 42 on the AC output side are arranged in the upper portion of the uninterruptible power supply module 10 in the housing 18, and the connection wiring 93 on the DC input side and the relay wirings 23, 33, and 43 on the DC input side are arranged in the lower portion of the uninterruptible power supply module 10 in the housing 18 in the aforementioned embodiment, the present invention is not restricted to this. In the present invention, the connection wiring on the AC input side, the relay wiring on the AC input side, the connection wiring on the AC output side, the relay wiring on the AC output side, the connection wiring on the DC input side, and the relay wiring on the DC input side may alternatively be arranged in the vicinity of a central portion in the housing of the uninterruptible power supply module. That is, the connection wiring on the AC input side, the relay wiring on the AC input side, the connection wiring on the AC output side, the relay wiring on the AC output side, the connection wiring on the DC input side, and the relay wiring on the DC input side may be arranged between the power converter of the uninterruptible power supply module and both the AC input-side switches and the AC output-side switches or between the power converter of the uninterruptible power supply module and the DC input-side switches.

While the uninterruptible power supply 100 includes the four uninterruptible power supply modules 10 (the first uninterruptible power supply module 1, the second uninterruptible power supply module 2, the third uninterruptible power supply module 3, and the fourth uninterruptible power supply module 4) in the aforementioned embodiment, the present invention is not restricted to this. For example, the uninterruptible power supply may alternatively include two, three, or five or more uninterruptible power supply modules.

While the uninterruptible power supply 100 includes the two disconnection modules 60 (the first disconnection module 6 and the second disconnection module 7) in the aforementioned embodiment, the present invention is not restricted to this. For example, the uninterruptible power supply may alternatively include one disconnection module or three or more disconnection modules.

While the connection wirings 91, 92, and 93 include one laminated bus bar in the aforementioned embodiment, the present invention is not restricted to this. In the present invention, the connection wiring may alternatively include a plurality of laminated bus bars. Furthermore, the connection wiring may alternatively include wiring made of a conductive member such as copper that is not covered with an insulator other than the laminated bus bar.

While the relay wirings 21, 22, and 23 (first relay wiring) include two laminated bus bars in the aforementioned embodiment, the present invention is not restricted to this. In the present invention, the first relay wiring may alternatively include one laminated bus bar or three or more laminated bus bars. Furthermore, the first relay wiring may alternatively include wiring made of a conductive member such as copper that is not covered with an insulator other than the laminated bus bars.

While the relay wirings 31, 32, and 33 (second relay wiring) include three laminated bus bars in the aforementioned embodiment, the present invention is not restricted to this. In the present invention, the second relay wiring may alternatively include one, two, or four or more laminated bus bars. Furthermore, the second relay wiring may alternatively include wiring made of a conductive member such as copper that is not covered with an insulator other than the laminated bus bars.

While the relay wirings 41, 42, and 42 (third relay wiring) include four laminated bus bars in the aforementioned embodiment, the present invention is not restricted to this. In the present invention, the third relay wiring may alternatively include one, two, three, or five or more laminated bus bars. Furthermore, the third relay wiring may alternatively include wiring made of a conductive member such as copper that is not covered with an insulator other than the laminated bus bars.

While the width W1 along the X direction per disconnection module 60 (each of the first disconnection module 6 and the second disconnection module 7) is smaller than the width W2 along the X direction per uninterruptible power supply module 10 in the aforementioned embodiment, the present invention is not restricted to this. In the present invention, the width per disconnection module may alternatively be larger than the width per uninterruptible power supply module, or the width per disconnection module may alternatively be equal to the width per uninterruptible power supply module.

While the disconnection switches 9 include the AC input disconnection switches 61 and the AC input disconnection switches 71 provided on the AC input sides of the uninterruptible power supply modules 10, the AC output disconnection switches 62 and the AC output disconnection switches 72 provided on the AC output sides, and the DC input disconnection switches 63 and the DC input disconnection switches 73 provided on the DC input sides in the aforementioned embodiment, the present invention is not restricted to this. In the present invention, the disconnection switches may alternatively be provided on one or two of the AC input sides, the AC output sides, and the DC input sides of the uninterruptible power supply modules.

While the relay wirings 21, 31, and 41 on the AC input side, the relay wirings 22, 32, and 42 on the AC output side, and the relay wirings 23, 33, and 43 on the DC input side are provided in the housing 18 in the aforementioned embodiment, the present invention is not restricted to this. In the present invention, the relay wiring may alternatively be provided on one or two of the AC input side, the AC output side, and the DC input side.

While the control module 8 provided in the uninterruptible power supply 100 controls the plurality of uninterruptible power supply modules 10 (the first uninterruptible power supply module 1, the second uninterruptible power supply module 2, the third uninterruptible power supply module 3, and the fourth uninterruptible power supply module 4) in the aforementioned embodiment, the present invention is not restricted to this. In the present invention, the control module may not be provided, and the plurality of uninterruptible power supply modules may alternatively be controlled by a controller(s) provided in the input/output module or the disconnection modules. In this case, the direct transmission circuit is provided in the input/output module or the disconnection modules.

What is claimed is:

1. An uninterruptible power supply comprising:
   a plurality of uninterruptible power supply modules each including a power converter that converts power received from an AC power supply outside the uninterruptible power supply;
   inputter/outputter that inputs the power received from the AC power supply outside the uninterruptible power supply to the power converter and outputs the power converted by the power converter to an outside of the uninterruptible power supply; and
   a disconnector including a housing that houses a disconnection switch that electrically disconnects each of the plurality of uninterruptible power supply modules individually,
   wherein
   the disconnection switch includes a plurality of disconnection switches, and
   the plurality of disconnection switches housed in the housing of the disconnector includes an AC disconnection switch and a DC disconnection switch.

2. The uninterruptible power supply according to claim 1, wherein
   the plurality of uninterruptible power supply modules, the inputter/outputter, and the disconnector are integral with each other.

3. The uninterruptible power supply according to claim 1, wherein
   the plurality of disconnection switches performs a disconnection operation individually on each of the plurality of uninterruptible power supply modules, the plurality of disconnection switches corresponding to the plurality of uninterruptible power supply modules, respectively.

4. The uninterruptible power supply according to claim 3, wherein
   the AC disconnection switch includes an AC input disconnection switch provided between the AC power supply outside the uninterruptible power supply and each of the plurality of uninterruptible power supply modules and an AC output disconnection switch provided on an AC output side of each of the plurality of uninterruptible power supply modules, and the DC disconnection switch includes a DC input disconnection switch provided on a DC input side of each of the plurality of uninterruptible power supply modules.

5. The uninterruptible power supply according to claim 3, wherein the plurality of uninterruptible power supply modules is arranged adjacent to each other;

an uninterruptible power supply module arranged closest to the disconnector among the plurality of uninterruptible power supply modules includes connection wiring that electrically connects its own power converter to a corresponding one of the plurality of disconnection switches, and relay wiring that electrically connects remaining ones of the plurality of uninterruptible power supply modules to remaining ones of the plurality of disconnection switches; and the relay wiring is provided corresponding to each of the plurality of uninterruptible power supply modules to be relayed in the uninterruptible power supply module arranged closest to the disconnecting module.

6. The uninterruptible power supply according to claim 5, wherein the plurality of uninterruptible power supply modules includes a first uninterruptible power supply module, a second uninterruptible power supply module, and a third uninterruptible power supply module arranged in this order from a side of the inputter/outputter; and the relay wiring includes first relay wiring provided in the first uninterruptible power supply module, the first relay wiring connecting the second uninterruptible power supply module to a corresponding one of the plurality of disconnection switches, and second relay wiring provided in the first uninterruptible power supply module and the second uninterruptible power supply module, the second relay wiring connecting the third uninterruptible power supply module to a corresponding one of the plurality of disconnection switches.

7. The uninterruptible power supply according to claim 6, wherein the relay wiring further includes third relay wiring provided in the first uninterruptible power supply module, the second uninterruptible power supply module, and the third uninterruptible power supply module, the third relay wiring connecting another uninterruptible power supply module to a corresponding one of the plurality of disconnection switches when the another uninterruptible power supply module is arranged on a side of the third uninterruptible power supply module opposite to a side on which the second uninterruptible power supply module is arranged.

8. The uninterruptible power supply according to claim 6, wherein each of the connection wiring and the relay wiring includes at least one laminated bus bar in which a plurality of plate-shaped conductors and insulators that cover the plurality of plate-shaped conductors are stacked;

the first relay wiring includes at least two laminated bus bars connected to each other;

the second relay wiring includes at least three laminated bus bars connected to each other; and the connection wiring, the first relay wiring, and the second relay wiring overlap each other in a plan view.

9. The uninterruptible power supply according to claim 1, wherein the disconnector includes a plurality of disconnectors including a first disconnector and a second disconnector;

the first disconnector is connected to some of the plurality of uninterruptible power supply modules; and the second disconnector is connected to remaining ones of the plurality of the uninterruptible power supply modules.

10. The uninterruptible power supply according to claim 1, wherein the disconnector has a width smaller than a width of each of the plurality of uninterruptible power supply modules.

\* \* \* \* \*